(12) United States Patent
Tourapis et al.

(10) Patent No.: US 9,258,517 B2
(45) Date of Patent: Feb. 9, 2016

(54) METHODS AND APPARATUSES FOR ADAPTIVELY FILTERING VIDEO SIGNALS

(71) Applicant: Magnum Semiconductor, Inc., Milpitas, CA (US)

(72) Inventors: Alexandros Tourapis, Milpitas, CA (US); Lowell Leroy Winger, Waterloo (CA); Michael Willis Milne, Jr., Discovery Bay, CA (US); Daniel Joseph Bell, San Jose, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 473 days.

(21) Appl. No.: 13/731,896

(22) Filed: Dec. 31, 2012

(65) Prior Publication Data
US 2014/0185693 A1    Jul. 3, 2014

(51) Int. Cl.
  *H04N 7/01*    (2006.01)
  *H04N 11/20*    (2006.01)

(52) U.S. Cl.
  CPC ............. *H04N 7/0117* (2013.01); *H04N 7/012* (2013.01)

(58) Field of Classification Search
  USPC ................. 348/441, 443, 446, 448, 458, 459, 348/415.1, 412.1, 407.1, 305, 333.11, 550, 348/584, 665, 667, 726, 793, 835, 220.1, 348/14.14; 375/240.29, 240.18, 240.16, 375/240.02, 240.01, 350
  See application file for complete search history.

(56) References Cited

U.S. PATENT DOCUMENTS

| | | | | |
|---|---|---|---|---|
| 4,918,532 | A * | 4/1990 | O'Connor | 348/726 |
| 5,446,795 | A | 8/1995 | Devries et al. | |
| 5,485,279 | A * | 1/1996 | Yonemitsu et al. | 375/240.14 |
| 5,737,019 | A * | 4/1998 | Kim | 375/240.25 |
| 5,835,151 | A * | 11/1998 | Sun et al. | 348/441 |
| 5,949,471 | A * | 9/1999 | Yuen et al. | 725/27 |
| 5,973,739 | A * | 10/1999 | Nilsson | 375/240.1 |
| 5,990,958 | A * | 11/1999 | Bheda et al. | 348/407.1 |
| 6,018,366 | A * | 1/2000 | Asai et al. | 375/240.18 |
| 6,025,878 | A * | 2/2000 | Boyce et al. | 375/240.16 |
| 6,184,935 | B1 * | 2/2001 | Iaquinto et al. | 348/441 |
| 6,229,570 | B1 * | 5/2001 | Bugwadia et al. | 348/441 |
| 6,519,288 | B1 * | 2/2003 | Vetro et al. | 375/240.21 |

(Continued)

FOREIGN PATENT DOCUMENTS

| | | |
|---|---|---|
| KR | 10-2002-0026254 | 4/2002 |
| WO | 2014/105285 A1 | 7/2014 |

OTHER PUBLICATIONS

PCT Search Report and Written Opinion for International Appl No. PCT/US213/070414, Mailed Feb. 24, 2014.

*Primary Examiner* — Jefferey Harold
*Assistant Examiner* — Mustafizur Rahman
(74) *Attorney, Agent, or Firm* — Dorsey & Whitney LLP

(57) ABSTRACT

Methods and apparatuses for adaptively filtering video content are disclosed herein. An apparatus may include a filter configured to receive a video signal. The filter may further be configured to perform an up-conversion on a plurality of frames of the video signal to provide a plurality of up-converted frames. The filter may further be configured to filter the plurality of up-converted frames to provide a plurality of filtered frames and to perform a down-conversion operation on the plurality of filtered frames to provide a filtered video signal.

20 Claims, 7 Drawing Sheets

(56) References Cited

U.S. PATENT DOCUMENTS

| | | | |
|---|---|---|---|
| 6,556,193 B1 | 4/2003 | Auld et al. | |
| 7,215,380 B2 | 5/2007 | Lin et al. | |
| 7,295,763 B1 * | 11/2007 | Cooper et al. | 386/324 |
| 2002/0101535 A1 * | 8/2002 | Swan | 348/448 |
| 2002/0150166 A1 * | 10/2002 | Johnson | 375/240.29 |
| 2004/0085480 A1 * | 5/2004 | Salzer et al. | 348/584 |
| 2004/0130661 A1 * | 7/2004 | Jiang | 348/459 |
| 2005/0030424 A1 * | 2/2005 | De Haan et al. | 348/458 |
| 2005/0094030 A1 * | 5/2005 | Brelay | 348/441 |
| 2005/0105812 A1 * | 5/2005 | Molino et al. | 382/239 |
| 2006/0181643 A1 * | 8/2006 | De Haan | 348/458 |
| 2007/0086666 A1 | 4/2007 | Bruls | |
| 2008/0084932 A1 * | 4/2008 | Wang et al. | 375/240.24 |
| 2008/0263621 A1 * | 10/2008 | Austerlitz et al. | 725/139 |
| 2008/0267285 A1 * | 10/2008 | Lee | 375/240.02 |
| 2009/0097547 A1 * | 4/2009 | Ugur et al. | 375/240.02 |
| 2012/0294366 A1 * | 11/2012 | Eliyahu | 375/240.16 |

\* cited by examiner

METHODS AND APPARATUSES FOR ADAPTIVELY FILTERING VIDEO SIGNALS

TECHNICAL FIELD

Embodiments of the disclosed invention relate generally to video encoding, and more particularly, in one or more of the illustrated embodiments, to filtering video signals.

BACKGROUND

Devices including televisions, broadcast systems, mobile devices, and both laptop and desktop computers, may display video in response to receipt of video or other media signals, such as interlaced video signals. Typically, before signals are provided to devices, signals are filtered such that various characteristics, such as subjective quality and brightness, of the video are improved. Because video signals vary greatly both in content and nature, numerous filtering techniques have been developed directed to, for instance, the removal of distortion from a video signal. Filtering techniques include many approaches and typically are directed to filtering a native resolution or format of a video signal. For example, if content of a video signal is interlaced and/or has a particular resolution, filtering is applied to the interlaced content and/or at the particular resolution. Often, however, these approaches introduce artifacts, overfilter, and/or create a trade-off between spatial performance and resolution in video signals.

Moreover, many traditional filtering techniques are directed to filtering fields of a video signal independently, thereby compromising relationships between fields of a same frame. While some implementations have attempted to mitigate this, solutions have proven to be complicated and computationally demanding.

DETAILED DESCRIPTION

Figure 1:
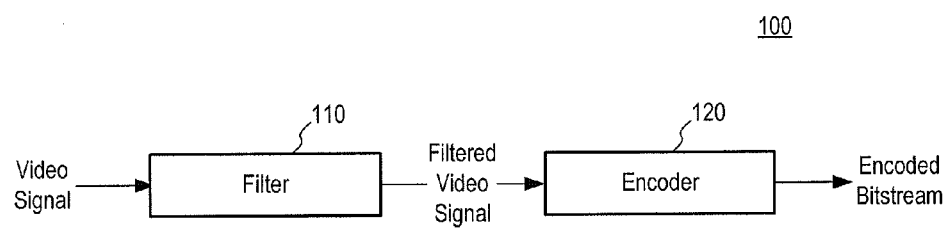
FIG. 1 is a block diagram of an apparatus according to an embodiment of the invention.

Methods and apparatuses for adaptively filtering video signals are disclosed herein. Video signals may include received signals over a network of communication channels and/or stored data representing video. In at least one embodiment, a video signal may be up-converted and filtered at a frame level. By up-converting the video to a different format and/or resolution prior to filtering, objective and/or subjective quality of a video signal may be improved and the introduction of artifacts may be reduced. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder, transcoder, or decoder components, circuits, control signals, timing protocols, and software operations have not been shown in detail in order to avoid unnecessarily obscuring the invention.

Embodiments of the present invention relate generally to progressive and interlaced video signals. As known, a video signal may include a series of pictures (e.g., frames). In progressive video signals, each frame may include a plurality of pixels captured at a same instant. In interlaced video signals, each frame may include a plurality of fields, where all pixels of each field are captured at a same instant unique to each field. For example, an interlaced frame may include two fields corresponding to first and second instants, respectively.

Further, each field may have a unique position and/or alignment in the frame. Commonly, fields may be interlaced such that two fields of a picture have a vertical misalignment of one pixel at the frame level, and accordingly may be "row interlaced." Other embodiments, such as those directed to three-dimensional video signals, may employ other methodologies. For example, a video signal may, additionally or alternatively, be column interlaced or checkerboard interlaced. Moreover, a video signal may be interlaced with one or more methods at subimage levels, where each subimage of a picture may correspond to a respective interlacing methodology and/or resolution.

Embodiments of the present invention further relate generally to de-interlacing. De-interlacing is a mechanism by which an interlaced video signal may be converted into a progressive video signal. Briefly, de-interlacing may interpolate respective fields of an interlaced frame to provide one or more progressive frames, and may be employed using spatial interpolation, temporal interpolation, or spatio-temporal interpolation. De-interlacing methodologies include, but are not limited to, bob, linear, kernel-adaptive, motion-adaptive, and motion-compensated, and further may include de-interlacing techniques using 2D/3D wavelets (wavelet-based de-interlacing), such as bandlets, ridgelets, and curvelets.

FIG. 1 is a block diagram of an apparatus 100 according to an embodiment of the invention. The apparatus 100 may include a filter 110 and an encoder 120. The filter 110 may be in electronic communication with (e.g., coupled to) the encoder 120 and may be configured to receive a signal, such as a video signal. The apparatus 100 may be implemented in any of a variety of devices employing video encoding, including but not limited to, televisions, tablets, broadcast systems, mobile devices, and both laptop and desktop computers. Generally, the filter 110 and encoder 120 may operate offline or in real time to provide a filtered video signal (e.g., filtered interlaced video signal) and encoded bitstream, respectively.

The filter 110 may include software elements, hardware elements, or a combination thereof, and further may include one or more logic circuits, control logic, logic gates, processors, memory, and/or any combination or sub-combination of the same. The filter 110 may receive a video signal and filter the video signal using one or more filtering methodologies known in the art, now or in the future. The filter 110 may filter progressive and/or interlaced video signals, and as will be explained in more detail below, may filter interlaced video signals by employing one or more techniques directed to filtering progressive video signals (e.g., progressive spatio-temporal processing). Responsive to filtering the video signal, the filter 110 may provide a filtered video signal.

The encoder 120 may include one or more logic circuits, control logic, logic gates, software elements, processors, memory, and/or any combination or sub-combination of the same, and may encode and/or compress the filtered video signal according to one or more encoding techniques. The encoder 120 may encode the filtered video signal, for instance, according to H.263, MPEG-4/H.264, HEVC, MPEG-2, or other coding standards and technologies, and may encode at a variable bit rate or at a constant bit rate. In at least one embodiment, the encoder 120 may include an entropy encoder, such as a context-adaptive variable-length coding (CAVLC) encoder, or a context-adaptive binary arithmetic coding (CABAC) encoder, and/or may be configured to encode data, for instance, at a macroblock level or at the coding unit level. Each macroblock or coding unit may be encoded in intra-coded mode, inter-coded mode, or a combination thereof, and/or may use single or multiple hypotheses (e.g. bi-prediction with two hypotheses). Accordingly, the encoder 120 may operate at a fixed rate (e.g., fixed frame rate) or at an adaptive frame rate, and may provide an encoded bitstream to one more devices, such as a decoder or a transcoder (not shown).

In an example operation of the apparatus 100, the filter 110 may receive a video signal and filter the video signal using one or more filtering methodologies. In this manner, noise in the video signal may be mitigated, images in the video signal may be resealed, subjective image quality of the video signal may be improved, objective image quality of the video signal may be improved, and/or the video signal may be characterized temporally and spatially. In one embodiment, the video signal may be interlaced, and as described, the filter 110 may process (e.g., filter) the interlaced video signal using techniques directed to filtering progressive video signals. By way of example, the filter 110 may de-interlace frames of the interlaced video signal to generate a plurality of de-interlaced frames. The filter 110 may filter each de-interlaced frame, for example, using progressive spatio-temporal processing methodologies such as motion compensated temporal filtering (MCTF) processing. Once filtered, each of the filtered frames may be re-interlaced to provide a filtered interlaced video signal. Once the filtered frames have been re-interlaced, the encoder 120 may receive and encode the filtered interlaced video signal in accordance with one or more encoding techniques to provide an encoded bitstream.

Examples described herein are directed to interlaced video signals and de-interlacing these signals prior to filtering such that a higher resolution representation of the video signal may be filtered. In other examples, additionally or alternatively, a different manipulation of video signals may be used to provide a different video signal representation. The manipulation, which may be applied to both interlaced and progressive video signals, may comprise an up-conversion operation, such as a spatial upscaling, an increase of pixel/bit-depth precision, a change in color formats, a change in color space, or a combination thereof. Subsequent processing (e.g. filtering) may be performed on the different resolution representation prior to returning the representation to the first resolution. Generally, then, a source may be received in a first resolution and converted to a second, generally higher, resolution representation for processing.

Figure 2:
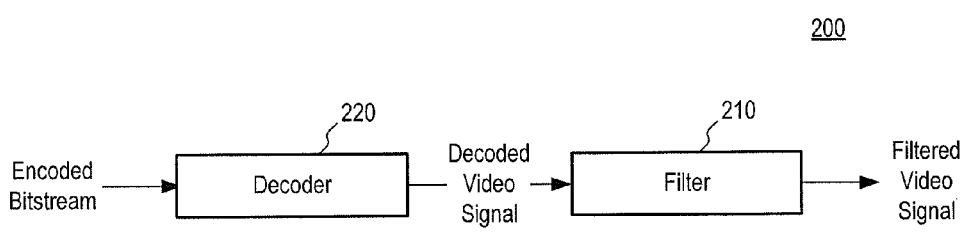
FIG. 2 is a block diagram of an apparatus according to an embodiment of the invention.

FIG. 2 is a block diagram of an apparatus 200 according to an embodiment of the invention. The apparatus 200 may include a decoder 220 and a filter 210. The decoder 220 may include one or more logic circuits, control logic, logic gates, processors, memory, and/or any combination or sub-combination of the same, and may decode and/or decompress a video signal using one or more decoding techniques known in the art, now or in the future. The decoder 220 may decode, for example, a bitstream (e.g., encoded bitstream), provided by an encoder, such as the encoder 120 of FIG. 1 to provide a decoded video signal such as a decoded interlaced video signal. The decoder 220 may be implemented in any of a variety of devices employing video encoding, including but not limited to, televisions, broadcast systems, mobile devices, and both laptop and desktop computers. The decoder 220 may further be compliant with the MPEG-4 AVC/H.264 coding standard, and in some embodiments, may additionally or alternatively be compliant with one or more other coding standards known in the art, such as the H.263 and HEVC coding standards.

The filter 210 may include software elements, hardware elements, or a combination thereof, and further may include one or more logic circuits, control logic, logic gates, processors, memory, and/or any combination or sub-combination of the same. The filter 210 may be coupled to the decoder 220 and may receive a decoded interlaced video signal therefrom. The filter 210 may filter the decoded interlaced video signal using one or more filtering methodologies known in the art, now or in the future. For example, the filter 210 may filter the decoded interlaced video signal by employing one or more techniques directed to filtering progressive content (e.g., progressive spatio-temporal processing). For example, as described with respect to the filter 110 of FIG. 1, the filter 210 may de-interlace frames of the decoded interlaced video signal to generate a plurality of de-interlaced frames. The filter 210 may filter each de-interlaced frame, and each filtered frame may be re-interlaced to provide a filtered interlaced video signal.

Accordingly, both the filter 110 of FIG. 1 and the filter 210 of FIG. 2 may filter an interlaced video signal, respectively. By first de-interlacing the interlaced video signal, higher quality images may be used during filtering processes. This may, for instance, reduce the number of artifacts and discontinuities (e.g., subfield discontinuities) introduced by the filtering processes. In one embodiment, for example, filtering in this manner may reduce aliasing. For example, by de-interlacing interlaced frames and subsequently filtering at a frame level, a video signal may be provided having less aliasing than a video signal filtered at the field level where fields are filtered without de-interlacing.

Because filtering may be applied to a video signal prior to an encoding process or following a decoding process, filtering may be employed as a pre-processing operation or a post-processing operation. Moreover, in at least one embodiment, frames of a video signal may be selectively filtered. In one embodiment, each component (e.g., color component) of a video signal may be selectively filtered based on the respective type of the component (luminance, red-difference chrominance, blue-difference chrominance). As an example, only chrominance components may be filtered and/or only frames corresponding to scenes having relatively high amounts of motion may be filtered.

Figure 3:
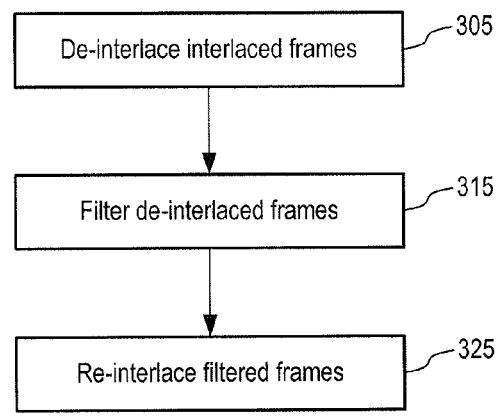
FIG. 3 is a process for filtering an interlaced video signal according to an embodiment of the invention.

FIG. 3 is a process 300 for filtering an interlaced video signal according to an embodiment of the invention. The process 300 may be implemented using, for instance, the filter 110 of FIG. 1. While the process 300 is described herein with respect to the filter 110, it will be appreciated by those having ordinary skill in the art that the process 300 may also be implemented using the filter 210 of FIG. 2 as well. At a step 305, an interlaced video signal may be received, for instance by the filter 110, and the frames of the interlaced video signal may be de-interlaced to provide a plurality of de-interlaced frames. Any de-interlacing methodology may be used, including, but not limited to, bob de-interlacing, linear de-interlacing, kernel adaptive de-interlacing, motion-adaptive de-interlacing, and motion compensated de-interlacing, as well as techniques directed to 2D and/or 3D wavelets. Once frames of the interlaced video signal have been de-interlaced to provide the de-interlaced frames, at a step 315, the de-interlaced frames may be filtered. As described, the de-interlaced frames may be filtered using techniques directed to filtering progressive video signals, such as MCTF processing. This may, for instance, allow the interlaced content to be filtered without over-filtering one or more fields of an interlaced frame and/or requiring mechanisms to account for cross-contamination and/or field discontinuities that may result from filtering fields independently. Once the de-interlaced frames have been filtered, at a step 325, each of the filtered frames may be re-interlaced to provide a filtered interlaced video signal. In some embodiments, re-interlacing may reverse the de-interlacing employed at the step 305 and/or may be based on the filtering methodologies employed at the step 315.

Figure 4:
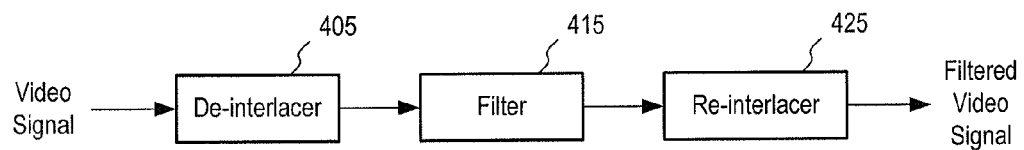
FIG. 4 is a block diagram of an apparatus according to an embodiment of the invention.

FIG. 4 is a block diagram of an apparatus 400 according to an embodiment of the invention. The apparatus 400 may include a de-interlacer 405, a filter 415, and a re-interlacer 425 and may be used to implement the filter 110 of FIG. 1 or the filter 210 of FIG. 2.

The de-interlacer 405 may receive a video signal and de-interlace the video signal in accordance with embodiments of the invention described herein to provide a plurality of de-interlaced frames. The de-interlacer 405 may be used to implement step 305 of the process 300 of FIG. 3. The filter 415 may be coupled to the de-interlacer 405 and may receive the plurality of de-interlaced frames. The filter 415 may filter the plurality of de-interlaced frames in accordance with embodiments of the invention described herein to provide a plurality of filtered frames. The filter 415 may be used to implement the step 315 of the process 300 of FIG. 3. The re-interlacer 425 may be coupled to the filter 415 and may receive the plurality of filtered frames. The re-interlacer 425 may re-interlace the plurality of filtered frames in accordance with embodiments of the invention described herein to provide a filtered interlaced video signal. The re-interlacer 425 may be used to implement the step 325 of the process 300 of FIG. 3.

Each element of the apparatus 400, including the de-interlacer 405, the filter 415, and the re-interlacer 425, may include software elements, hardware elements, or a combination thereof. Hardware elements may include one or more logic circuits, control logic, logic gates, one or more processors, memory, and/or any combination or sub-combination of the same, and further may be integrated in one or more integrated chipsets. Software elements may include software code embedded in one or more computer readable media that may be executed by the one or more processors.

Figure 5:
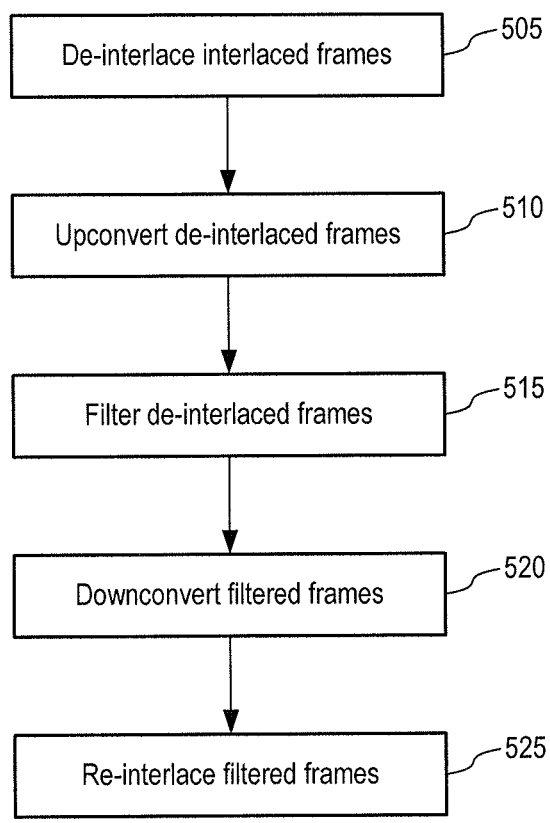
FIG. 5 is a process for filtering an interlaced video signal according to an embodiment of the invention.

FIG. 5 is a process 500 for filtering an interlaced video signal according to an embodiment of the invention. The process 500 may be implemented using, for instance, the filter 110 of FIG. 1 or the filter 210 of FIG. 2. At a step 505, an interlaced video signal may be received, for instance by the filter 110, and the frames of the interlaced video signal may be de-interlaced as described with respect to step 305 of FIG. 3. At a step 510, de-interlaced frames resulting from implementation of the step 505 may be selectively up-converted. An up-conversion operation performed on a de-interlaced frame may include, but is not limited to, a spatial upscaling, an increase of pixel/bit-depth precision, a change in color formats, and/or a change in color space. Moreover, an up-conversion operation may be applied to all components of a video signal, or may be applied to less than all components of a video signal (e.g., luminance only). Whether an up-conversion operation is applied to one or more components may be based, at least in part, on a component type and/or the importance of the component to a particular coding unit, such as a scene or sequence.

Once any up-conversion has been performed, each de-interlaced frame may be filtered at a step 515, as described with respect to step 315. Responsive to filtering, each frame may be downconverted at a step 520. This down-conversion may, for instance, return each frame to its original format and/or resolution by reversing the up-conversion operation of step 510, or may perform a down-conversion operation in a different manner. Finally, at a step 525, frames may be re-interlaced to produce a filtered interlaced video signal, as described with respect to step 325. While the step 520 has been described as occurring prior to the step 525, in at least one embodiment, steps 520 and 525 may be implemented simultaneously.

Figure 6:
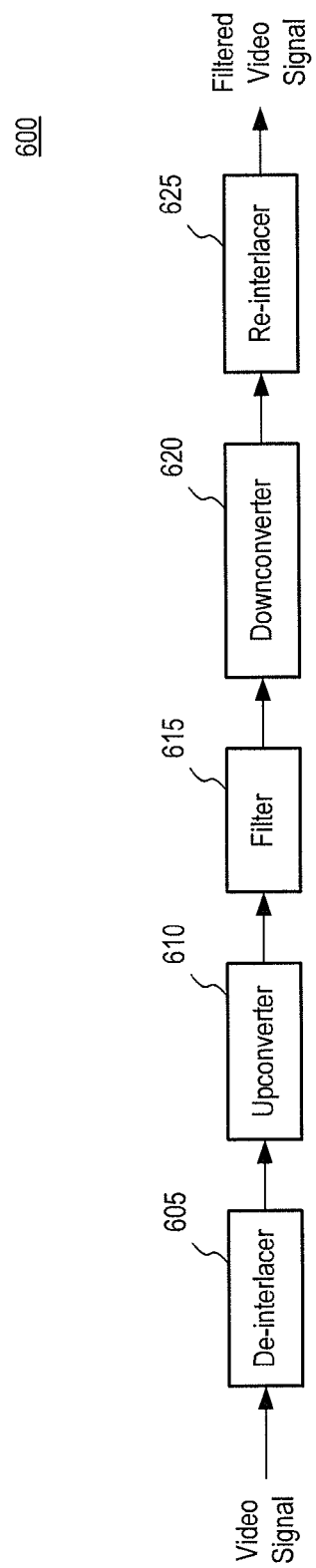
FIG. 6 is a block diagram of an apparatus according to an embodiment of the invention.

FIG. 6 is a block diagram of an apparatus 600 according to an embodiment of the invention. The apparatus 600 may include a de-interlacer 605, an upconverter 610, a filter 615, a downconverter 620, and a re-interlacer 625 and may be used to implement the filter 110 of FIG. 1 or the filter 210 of FIG. 2.

The de-interlacer 605 may receive a video signal and de-interlace the video signal in accordance with embodiments of the invention described herein, to provide a plurality of de-interlaced frames. The de-interlacer 605 may be used to implement step 505 of the process 500 of FIG. 5. The upconverter 610 may be coupled to the de-interlacer 605 and may selectively upconvert the plurality of de-interlaced frames in accordance with embodiments of the invention described herein. The upconverter 610 may be used to implement step 510 of the process 500 of FIG. 5. The filter 615 may be coupled to the upconverter 610 and may receive the plurality of de-interlaced frames from the upconverter 610. The filter 615 may filter the plurality of de-interlaced frames in accordance with embodiments of the invention described herein to provide a plurality of filtered frames. The filter 615 may be used to implement the step 515 of the process 500 of FIG. 5. The downconverter 620 may be coupled to the filter 615 and may receive the plurality of filtered frames. The downconverter 620 may selectively downconvert the plurality of filtered frames in accordance with embodiments of the invention described herein. The downconverter 620 may be used to implement the step 520 of the process 500 of FIG. 5. The re-interlacer 625 may be coupled to the downconverter 620 and may receive the plurality of filtered frames. The re-interlacer 625 may re-interlace the plurality of filtered frames in accordance with embodiments of the invention described herein to provide a filtered interlaced video signal. The re-interlacer 625 may be used to implement the step 525 of the process 500 of FIG. 5.

Each element of the apparatus 600, including the de-interlacer 605, the upconverter 610, the filter 615, the downconverter 620, and the re-interlacer 625, may include software elements, hardware elements, or a combination thereof. Hardware elements may include one or more logic circuits, control logic, logic gates, one or more processors, memory, and/or any combination or sub-combination of the same, and further may be integrated in one or more integrated chipsets. Software elements may include software code embedded in one or more computer readable media that may be executed by the one or more processors.

Figure 7:
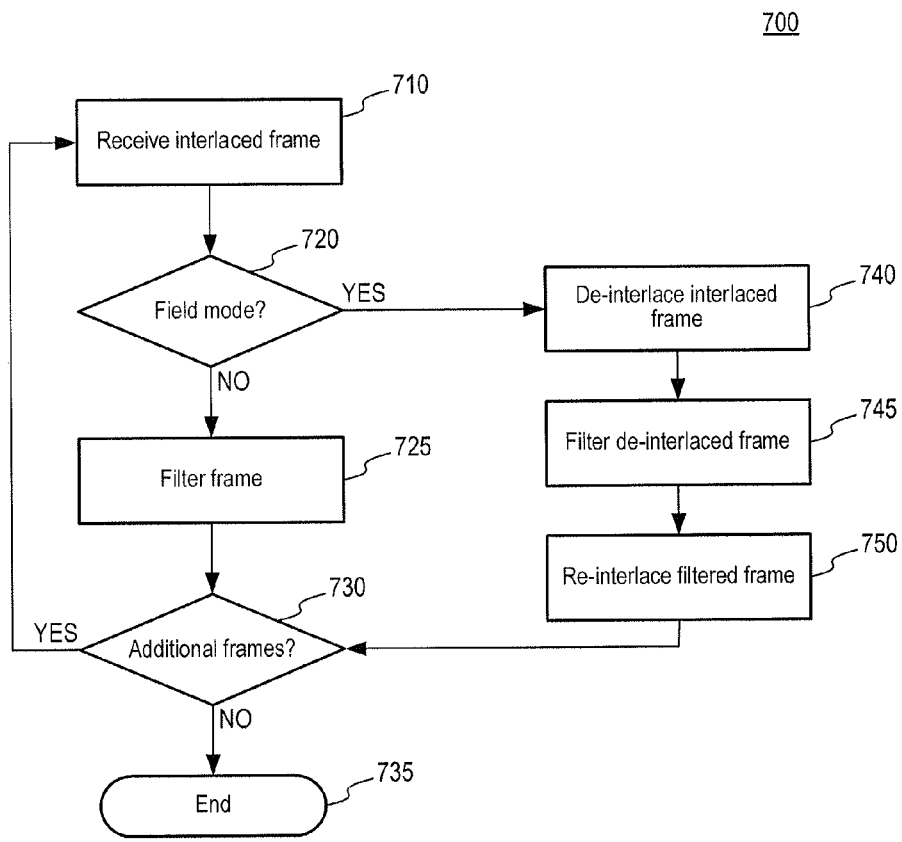
FIG. 7 is a process for filtering an interlaced video signal according to an embodiment of the invention.

FIG. 7 is a process 700 for filtering an interlaced video signal according to an embodiment of the invention. The process 700 may be implemented using, for instance, the filter 110 of FIG. 1 or the filter 210 of FIG. 2. At a step 710, a first frame of an interlaced video signal may be received, for instance, by the filter 110. At a step 720, the frame of the interlaced video signal may be analyzed. The analysis may determine, for instance, whether to flag the frame for a progressive (frame) mode or whether to flag the frame for an interlaced (field) mode. Whether a frame is flagged for the progressive mode or for the interlaced mode may be based on motion estimation analysis of the frame, band-pass filtering, and/or other feathering detection techniques as known in the art. In at least one embodiment, frames corresponding to relatively high amounts of motion may be flagged for the interlaced mode and frames corresponding to relatively low amounts of motion may be flagged for the progressive mode. In at least one embodiment, whether a flag is framed for the progressive mode or interlaced mode may be indicated in the bitstream or may be provided separately in the video signal.

If the frame is flagged as progressive, at a step 725, the frame may be filtered using one or more spatio-temporal filtering techniques, such as MCTF processing. In one embodiment, the frame may be upconverted prior to being filtered and/or downconverted after being filtered, as described above. Moreover, macroblock-level decisions operating in a field mode may be applied.

At a step 730, it may be determined if additional frames remain in the video signal. If no frames remain in the video signal, the process 700 may terminate at a step 735. If one or more frames remain in the video signal, the next frame may be received at the step 710, as described above.

If the frame is flagged as interlaced, the frame may be de-interlaced at a step 740, for example, as described above with reference to step 305 of FIG. 3. As previously described, the frame may further be upconverted at the step 305. Once a de-interlaced frame has been provided from de-interlacing the interlaced frame, the de-interlaced frame may be filtered at a step 745. This may include applying techniques directed to filtering progressive video signals, such as MCTF processing. At a step 750, the filtered frame may be downconverted if previously upconverted, and may be re-interlaced. At a step 730, if other frames remain in the video signal, the respective steps of the process 700 may be iteratively repeated.

Accordingly, an interlaced video signal may be filtered using the process 700. Based on the analysis performed at the step 720, only a portion of the frames of the video signal may be de-interlaced and/or re-interlaced as described herein. This may allow for reduced signal processing, for instance, in portions of the interlaced video signal having relatively low motion (recall that in some embodiments these portions may be filtered without prior de-interlacing). In another embodiment, frames flagged as progressive may be filtered at the frame level and those frames flagged as interlaced may be processed at the field level.

Embodiments of filters according to the present invention may be implemented using hardware (e.g., logic gates, logic circuits, and/or other processing hardware arranged to perform the described filtering) or software (e.g., one or more processors and software code embedded in a computer readable medium, that when executed, may cause the one or more processors to perform the described filtering), or combinations thereof.

Figure 8:
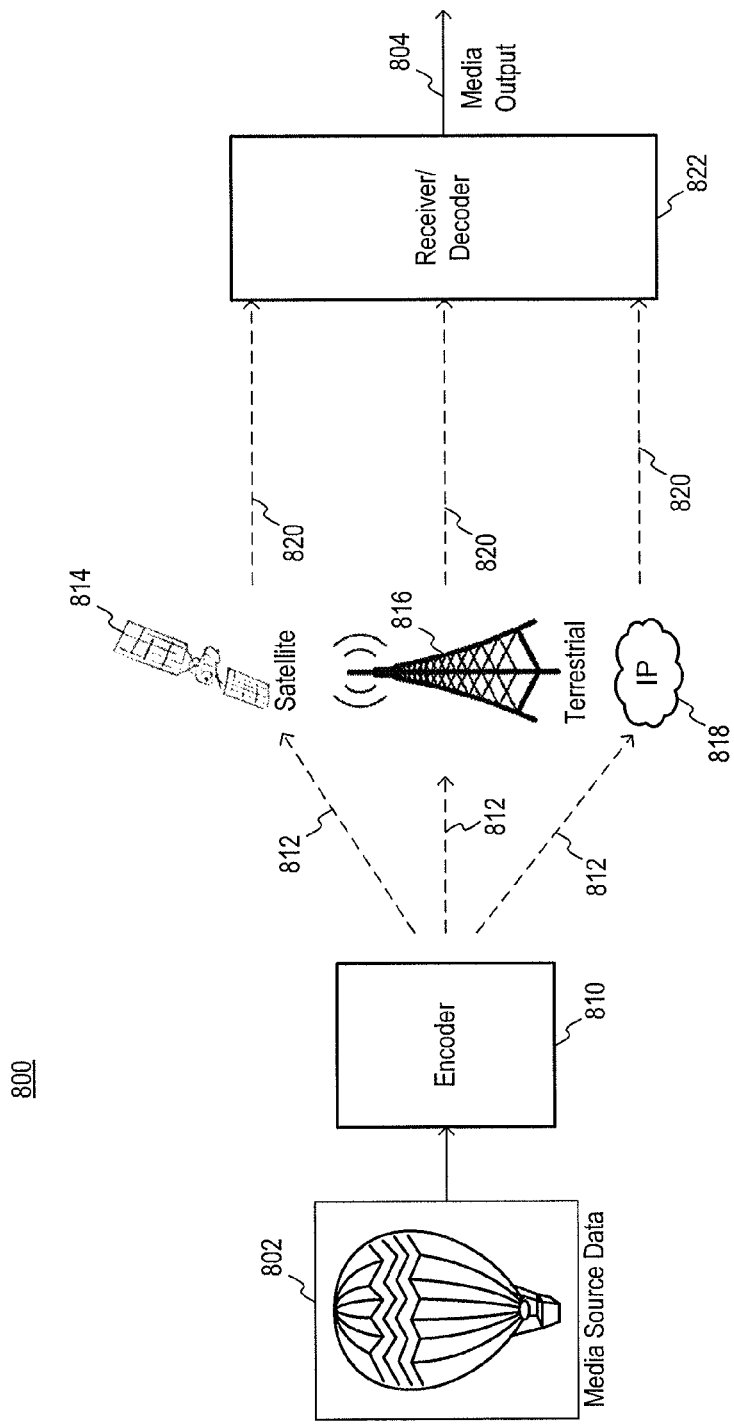
FIG. 8 is a schematic illustration of a media delivery system according to an embodiment of the invention.

FIG. 8 is a schematic illustration of a media delivery system 800 in accordance with embodiments of the present invention. The media delivery system 800 may provide a mechanism for delivering a media source 802 to one or more of a variety of media output(s) 804. Although only one media source 802 and media output 804 are illustrated in FIG. 8, it is to be understood that any number may be used, and examples of the present invention may be used to broadcast and/or otherwise deliver media content to any number of media outputs.

The media source data 802 may be any source of media content, including but not limited to, video, audio, data, or combinations thereof. The media source data 802 may be, for example, audio and/or video data that may be captured using a camera, microphone, and/or other capturing devices, or may be generated or provided by a processing device. Media source data 802 may be analog and/or digital. When the media source data 802 is analog data, the media source data 802 may be converted to digital data using, for example, an analog-to-digital converter (ADC). Typically, to transmit the media source data 802, some mechanism for compression and/or encryption may be desirable. Accordingly, an apparatus 810 may be provided that may filter and/or encode the media source data 802 using any methodologies in the art, known now or in the future, including encoding methods in accordance with video standards such as, but not limited to, MPEG-2, MPEG-4, H.263, MPEG-4 AVC/H.264, HEVC, VC-1, VP8 or combinations of these or other encoding standards. The apparatus 810 may be implemented with embodiments of the present invention described herein. For example, the apparatus 810 may be implemented using the apparatus 100 of FIG. 1 or the apparatus 200 of FIG. 2.

The encoded data 812 may be provided to a communications link, such as a satellite 814, an antenna 816, and/or a network 818. The network 818 may be wired or wireless, and further may communicate using electrical and/or optical transmission. The antenna 816 may be a terrestrial antenna, and may, for example, receive and transmit conventional AM and FM signals, satellite signals, or other signals known in the art. The communications link may broadcast the encoded data 812, and in some examples may alter the encoded data 812 and broadcast the altered encoded data 812 (e.g. by re-encoding, adding to, or subtracting from the encoded data 812). The encoded data 820 provided from the communications link may be received by a receiver 822 that may include or be coupled to a decoder. The decoder may decode the encoded data 820 to provide one or more media outputs, with the media output 804 shown in FIG. 8. The receiver 822 may be included in or in communication with any number of devices, including but not limited to a modem, router, server, set-top box, laptop, desktop, computer, tablet, mobile phone, etc.

The media delivery system 800 of FIG. 8 and/or the apparatus 810 may be utilized in a variety of segments of a content distribution industry.

Figure 9:
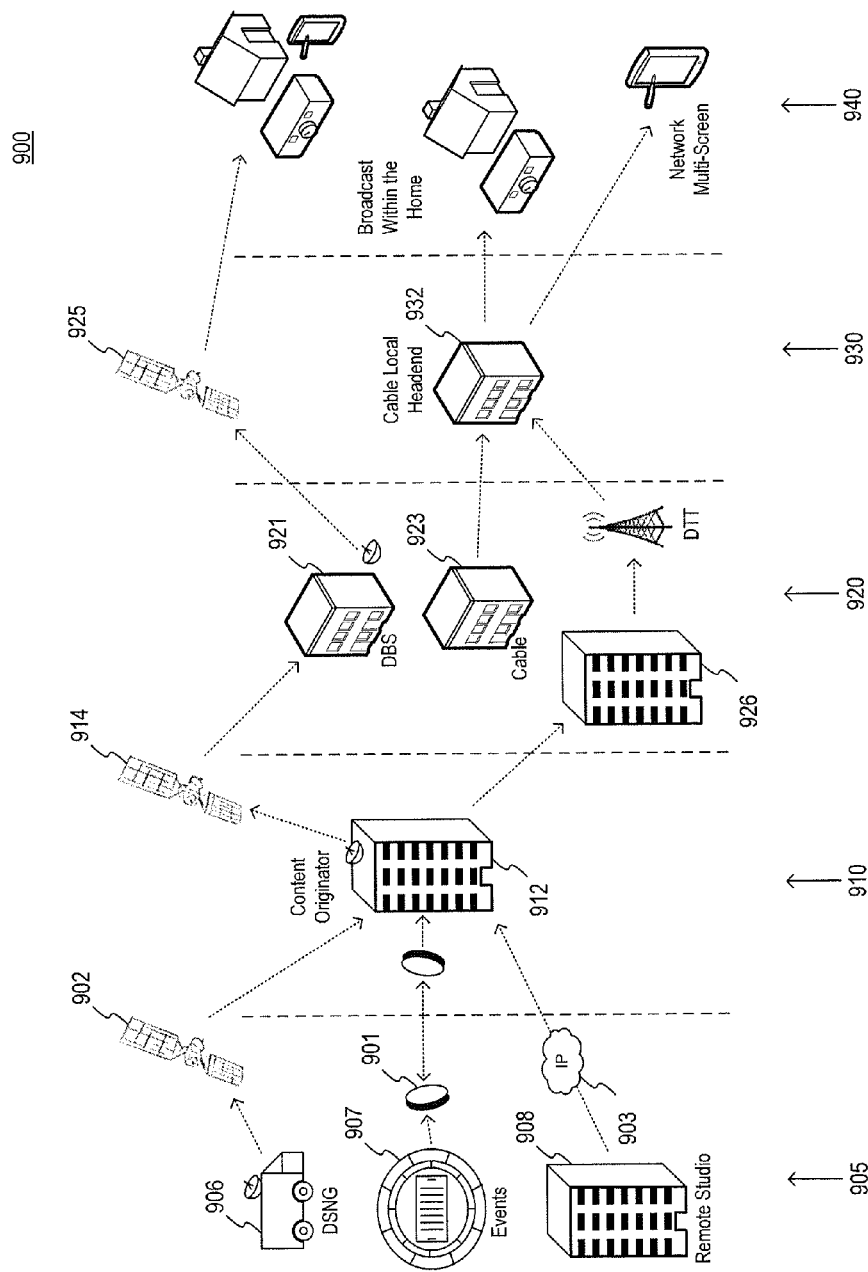
FIG. 9 is a schematic illustration of a video distribution system that may make use of apparatuses described herein.

FIG. 9 is a schematic illustration of a video distribution system 900 that may make use of apparatuses described herein. The video distribution system 900 includes video contributors 905. The video contributors 905 may include, but are not limited to, digital satellite news gathering systems 906, event broadcasts 907, and remote studios 908. Each or any of these video contributors 905 may utilize an apparatus described herein, such as the apparatus 100 of FIG. 1 and the apparatus 200 of FIG. 2, to encode media source data and provide encoded data to a communications link. The digital satellite news gathering system 906 may provide encoded data to a satellite 902. The event broadcast 907 may provide encoded data to an antenna 901. The remote studio 908 may provide encoded data over a network 903.

A production segment 910 may include a content originator 912. The content originator 912 may receive encoded data from any or combinations of the video contributors 905. The content originator 912 may make the received content available, and may edit, combine, and/or manipulate any of the received content to make the content available. The content originator 912 may utilize apparatuses described herein, such as the apparatus 100 of FIG. 1 or the apparatus 200 of FIG. 2, to provide encoded data to the satellite 914 (or another communications link). The content originator 912 may provide encoded data to a digital terrestrial television system 916 over a network or other communication link. In some examples, the content originator 912 may utilize a decoder to decode the content received from the contributor(s) 905. The content originator 912 may then re-encode data and provide the encoded data to the satellite 914. In other examples, the content originator 912 may not decode the received data, and may utilize a transcoder to change a coding format of the received data.

A primary distribution segment 920 may include a digital broadcast system 921, the digital terrestrial television system 916, and/or a cable system 923. The digital broadcasting system 921 may include a receiver, such as the receiver 822 described with reference to FIG. 8, to receive encoded data from the satellite 914. The digital terrestrial television system 916 may include a receiver, such as the receiver 822 described with reference to FIG. 8, to receive encoded data from the content originator 912. The cable system 923 may host its own content which may or may not have been received from the production segment 910 and/or the contributor segment 905. For example, the cable system 923 may provide its own media source data 802 as that which was described with reference to FIG. 8.

The digital broadcast system 921 may include an apparatus, such as the apparatus 810 described with reference to FIG. 8, to provide encoded data to the satellite 925. The cable system 923 may include an apparatus, such as the apparatus 100 of FIG. 1 or the apparatus 200 of FIG. 2, to provide encoded data over a network or other communications link to a cable local headend 932. A secondary distribution segment 930 may include, for example, the satellite 925 and/or the cable local headend 932.

The cable local headend 932 may include an apparatus, such as the apparatus 100 of FIG. 1 or the apparatus 200 of FIG. 2, to provide encoded data to clients in a client segment 840 over a network or other communications link. The satellite 925 may broadcast signals to clients in the client segment 940. The client segment 940 may include any number of devices that may include receivers, such as the receiver 822 and associated decoder described with reference to FIG. 8, for decoding content, and ultimately, making content available to users. The client segment 940 may include devices such as set-top boxes, tablets, computers, servers, laptops, desktops, cell phones, etc.

Accordingly, filtering, encoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:
   a filter configured to receive a video signal and perform an up-conversion operation on a plurality of frames of the video signal to provide a respective plurality of up-converted frames, the filter further configured to filter the plurality of up-converted frames to provide a plurality of filtered frames and perform a down-conversion operation on the plurality of filtered frames to provide a filtered video signal.

2. The apparatus of claim 1, wherein the filter is further configured to perform the up-conversion operation on the plurality of frames based, at least in part, on a respective amount of motion to which each of the plurality of frames corresponds.

3. The apparatus of claim 1, further comprising:
   an encoder coupled to the filter and configured to receive the filtered video signal, the encoder further configured to provide an encoded bitstream based, at least in part, on the filtered video signal.

4. The apparatus of claim 1, wherein the filter is further configured to filter the plurality of up-converted frames using motion-compensated temporal filtering processing.

5. The apparatus of claim 1, wherein the filter is configured to perform the up-conversion operation by de-interlacing the plurality of frames.

6. The apparatus of claim 1, wherein the filter is configured to selectively filter components of each of the plurality of up-converted frames based, at least in part, on a respective type of each of the plurality of components for each of the plurality of up-converted frames.

7. The apparatus of claim 1, wherein the filter is further configured to de-interlace at least one of the plurality of up-converted frames prior to filtering the at least one of the plurality of up-converted frames.

8. The apparatus of claim 1, wherein the up-conversion process comprises a spatial upscaling, an increase of pixel/bit-depth precision, a change in color formats, a change in color space, or a combination thereof.

9. A method, comprising:
   de-interlacing, with a filter, a frame of a video signal to provide a de-interlaced frame;
   filtering the de-interlaced frame to provide a filtered frame; and
   re-interlacing the filtered frame to provide a filtered video signal.

10. The method of claim 9, further comprising:
    after said de-interlacing, performing an up-conversion operation on the de-interlaced frame; and
    after said filtering, performing a down-conversion operation on the filtered frame.

11. A method, comprising:
    up-converting, with a filter, a frame of a video signal to provide an up-converted frame;
    filtering the up-converted frame to provide a filtered frame; and
    down-converting, with the filter, the filtered frame to provide a frame of a filtered video signal.

12. The method of claim 11, wherein said filtering the up-converted frame, comprises:
    a spatial upscaling of the frame, an increase of pixel/bit-depth precision of the frame, a change in color formats of the frame, a change in a color space of the frame, or a combination thereof.

13. The method of claim 11, wherein said up-converting, with a filter, a frame comprises:
    de-interlacing the frame in accordance with bob de-interlacing, linear de-interlacing, kernel adaptive de-interlacing, motion-adaptive de-interlacing, motion compensated de-interlacing, wavelet-based de-interlacing, or a combination thereof.

14. A method, comprising:
   analyzing, with a filter, a frame to determine whether to flag the frame as progressive or interlaced;
   if the frame is flagged as progressive:
      filtering the frame; and
   if the frame is flagged as interlaced:
      de-interlacing the frame to provide a de-interlaced frame;
      filtering the de-interlaced frame to provide a filtered frame; and
      re-interlacing the filtered frame.

15. The method of claim 14, wherein said analyzing is based, at least in part, on a motion estimation analysis.

16. The method of claim 14, wherein said filtering a frame comprises filtering the frame in accordance with progressive spatio-temporal processing, and said filtering the de-interlaced frame comprises filtering the de-interlaced frame in accordance with progressive spatio-temporal processing.

17. The method of claim 16, wherein the progressive spatio-temporal processing comprises motion-compensated temporal filtering processing.

18. The method of claim 14, further comprising:
   after said de-interlacing the frame, performing an up-conversion operation on the de-interlaced frame.

19. The method of claim 15, wherein said filtering the de-interlaced frame comprises:
   selectively filtering each of a plurality of components of the de-interlaced frame based, at least in part, on the respective types of each of the plurality of components of the de-interlaced frame.

20. The method of claim 15, further comprising:
   encoding, with an encoder, at least one of the filtered frame and the re-interlaced frame.

* * * * *